US008555088B2

(12) United States Patent
Saarinen et al.

(10) Patent No.: US 8,555,088 B2
(45) Date of Patent: Oct. 8, 2013

(54) METHOD AND APPARATUS FOR IMPLEMENTING SECURE AND SELECTIVELY DENIABLE FILE STORAGE

(75) Inventors: Markku-Juhani Saarinen, Helsinki (FI); Ville Ollikainen, Vihti (FI)

(73) Assignee: Envault Corporation Oy, Vaanta (FI)

( * ) Notice: Subject to any disclaimer, the term of this patent is extended or adjusted under 35 U.S.C. 154(b) by 261 days.

(21) Appl. No.: 13/120,002

(22) PCT Filed: Mar. 16, 2009

(86) PCT No.: PCT/FI2009/000035
§ 371 (c)(1),
(2), (4) Date: Mar. 21, 2011

(87) PCT Pub. No.: WO2010/031894
PCT Pub. Date: Mar. 25, 2010

(65) Prior Publication Data
US 2011/0208979 A1     Aug. 25, 2011

(30) Foreign Application Priority Data

Sep. 22, 2008 (FI) .................................... 20080534
Dec. 23, 2008 (FI) .................................... 20080681

(51) Int. Cl.
*G06F 7/04* (2006.01)
(52) U.S. Cl.
USPC ............................ 713/193; 380/37; 726/27
(58) Field of Classification Search
None
See application file for complete search history.

(56) References Cited

U.S. PATENT DOCUMENTS

| 6,493,825 | B1 * | 12/2002 | Blumenau et al. ............ 713/168 |
| 7,698,560 | B2 * | 4/2010 | Tune .............................. 713/179 |
| 8,117,464 | B1 * | 2/2012 | Kogelnik ....................... 713/193 |
| 2001/0012001 | A1 | 8/2001 | Rekimoto et al. |
| 2007/0046625 | A1 | 3/2007 | Yee |
| 2007/0101163 | A1 * | 5/2007 | Ando et al. .................... 713/193 |
| 2007/0101164 | A1 * | 5/2007 | Ando et al. .................... 713/193 |
| 2007/0165865 | A1 | 7/2007 | Talvitie |
| 2008/0150913 | A1 | 6/2008 | Bell et al. |
| 2008/0273697 | A1 | 11/2008 | Greko et al. |
| 2009/0268903 | A1 * | 10/2009 | Bojinov et al. ................ 380/45 |

FOREIGN PATENT DOCUMENTS

EP      1715437 A2     10/2006

OTHER PUBLICATIONS

Thinsight: Integrated Optical Multi-touch Sensing through Thin Form-factor Displays by Izadi et al., Association of Computing Machinery, 2007.
Central Management and Control (CMC) for Cruzem Enterprise USB Flash Drives [online]. SanDisk Corporation, Jul. 4, 2008.
Martin L. Key-Management Infrastructure for Protecting Stored Data. Computer, vol. 41, No. 6, Jun. 1, 2008 , pp. 103-104.
SafeStickB [online]. Purple Rage Limited, Dec. 3, 2009.

* cited by examiner

*Primary Examiner* — Kaveh Abrishamkar
(74) *Attorney, Agent, or Firm* — Shalom Wertsberger; Saltamar Innovations (57) ABSTRACT

The invention concerns a method for writing data to a memory device arrangement comprising a first and a second memory device in which the first memory device comprises data blocks numbered with block numbers and the second memory device comprises at least one reference calculated from a data block digest and its physical block number. The invention is characterized in that it comprises the following steps: calculating the digest from at least part of the data block content, receiving at least one physical block number, to which the data block contents in the first memory device is stored, encrypting the data block content, storing the data block content to the first memory device to the position pointed by the physical block number, and storing or issuing a command to save the digest, or a number derived from it, and at least one said physical block number to the second memory device. Also a system, a computer program and server computer in accordance to the invention are presented.

9 Claims, 9 Drawing Sheets

Fig. 1

Prior art

Fig. 2

Prior art

METHOD AND APPARATUS FOR IMPLEMENTING SECURE AND SELECTIVELY DENIABLE FILE STORAGE

FIELD OF THE INVENTION

The invention relates to encryption and cryptography. A manual in the field is Handbook of Applied Cryptography (Discrete Mathematics and Its Applications), written by Alfred Menezes, Paul van Oorschot and Scott Vanstone (CRC Press, 1996, ISBN 978-0849385230).

Particularly the invention relates to encrypting a block data storage, hiding data stored to the data storage, selectively denying existence of the hidden data, and version control of content in the data storage.

BACKGROUND OF THE INVENTION

Let's first study data block processing.

A block data storage consists of a set of fixed size blocks into which information is stored. Each block has its own identifier, usually a sequence number. This sequence number is commonly known as block number.

A typical example of a block data storage are computer mass memories, such as hard disk drives (HDD) or semiconductor based persistent memories (SSD=Solid State Disk). When information is written to a mass memory storage or read from there, write or read position in based on a logical block address (LBA). When using LBA, the blocks are numbered in a sequential order starting from zero, a typical block size being 512, 1,024 or 2,048 bytes.

In addition to LBA also other block identifiers are used, for example MFM hard drives (Modified Frequency Modulation) in old PC equipment were using CHS addressing (cylinder-head-sector), in which the disc track, read head and disc sector had individual identifiers. Thus, there were three parameters in CHS. CHS addressing can be converted to LBA, whenever the maximum values for at least two of these three parameters are known. The following equation holds between CHS and LBA block number (lba) applies $$lba=(((c*MAX\_H)+h)*MAX\_S)+s-1, \quad (i)$$

where MAX_H is the number of read heads and MAX_S the number of sectors, and c, h, and s are track, read head and the disk sector parameters of the CHS address.

In general we can say that there is a wide range of data storages where block addressing may be converted one way or another to the logical block number.

A file system, which is usually created on top of the block data storage, enables storing data as files. The file system, among other things, takes care of defining logical block numbers for data read and write operations.

The most common file systems support restoring a deleted file, but in general restoring the entire device back to a previous state is difficult, if not impossible.

Second, let's study data block encryption.

Data blocks are typically encrypted by using a block encryption algorithm, such as AES-256, which allows plaintext to be converted to ciphertext using an encryption key. The block size of many encryption algorithms is however smaller than a typical block size of the block data storage, for example in the mentioned AES-256 it is 16 bytes. For this reason, to encrypt one block of a data storage, a number of encryption blocks must be combined.

IEEE (Institute of Electrical and Electronics Engineers) has published the XTS-AES-standard, IEEE P1619 (IEEE Standard for Cryptographic Protection of Data on Block-Oriented Storage Devices, IEEE Std 1619™-2007, 18 Apr. 2008), especially for encrypting disc or tape storage blocks.

Also other methods have been developed for combining the encryption blocks in data storage block encryption, such as the previously most common CBC mode, in which encryption blocks are chained one after another. Compared to chaining XTS-AES has an advantage, among other things, that encryption blocks can be processed in parallel.

The mentioned XTS-AES-standard presents a notation for encryption $$C \leftarrow \text{XTS-AES-Enc}(Key,P,i) \quad (ii)$$

and decryption $$P \rightarrow \text{XTS-AES-Dec}(Key,C,i) \quad (iii)$$

where Key is a 256 or 512-bit XTS-AES key, P plaintext, C ciphertext, and i a 128-bit tweak. Algorithm details can be found in the standard.

Despite the strength of the encryption algorithm, one of the weak links in conventional encryption is the encryption user: Encryption keys are mostly derived from a password defined by the user. Once the user defines the password, he may

- form it from a proper or common noun, or
- use the same password in different situations.

If the password is derived from a proper or common noun, the password can be guessed using a commonly known dictionary attack, in which known words are varied and attempted to use them as passwords one after another.

If the user uses the same password or its derivatives in different situations, finding the password in one situation makes it easier to access other data storages of the same user. Changing the password afterwards in many data storages is laborious, so it's rarely done just in case.

Third, let's study information hiding (steganography).

Part of the data storage blocks can be hidden. It is essential in hiding that the existence of hidden data cannot be detected, unless there is an explicit access to it. In this case, the existence of hidden data may be denied. (One reference to the subject is Anderson, R., Needham, R., and Shamir, A. The steganographic file system. In Information Hiding, Second International Workshop, Portland, Oreg., USA, Apr. 14-17, 1998, Proceedings (1998), D. Aucsmith, Ed., vol 1525 of Lecture Notes in Computer Science, Springer, pp. 73-82)

The hidden part of the data storage will hereafter be referred as a hidden volume.

Although the content in the hidden volume could not be found, its existence may easily become exposed. For example, one can store to a normal block data storage the amount of data equivalent to the total capacity of blocks: If the amount of data which is its nominal capacity can not be written to the storage, one can reasonably assume that some capacity is reserved for other uses, such as for a hidden volume.

When the existence of hidden data is suspected with a good reason, the holder of data volume can be compelled to reveal it. In the case of the hidden volume, whose existence can be denied, the same kind of pressure can not be reasoned as obviously.

Fourth, let's study SSD storage devices.

SSD storage devices are replacing traditional hard disk drives especially as laptop storage devices, but also in certain server applications. It is likely that SSD will eventually replace hard disk drives due to its power consumption, impact resistance and other mechanical strength, silent operation and non-existent seek time. Most SSD storage devices are based on Flash technology.

Storage capacity and data transfer rate of hard disk technology have grown rapidly for decades. Yet one of the hard disk technology limitations has remained almost unchanged—seek time. In hard disk drives data is written on and read from the surface of the disk using a read head mounted on an actuator arm. Moving the actuator arm back and forth is causing typically 4-10 ms delay in disk read and write, unless the data is located sequentially on the surface of the disc, stored in adjacent tracks.

SSD devices do not have similar seek time problem. Data is addressed electronically, and the lag from changing the reading and writing position is non existent. Thus, the speed of random access in SSD memory devices is almost the speed of sequential access.

SSD memory devices have, however, one weakness: the amount of write cycles is limited. Using Flash technology each memory cell can be typically written from 10000 to 100000 times, which in continuous use shortens the lifetime of the memory device. Lifetime can be extended, for example using methods that recycle recordable memory cells. One of the related patents is U.S. Pat. No. 6,850,443, "Wear leveling techniques for flash EEPROM systems".

Fifth, let's study data integrity.

In practice, all block data storages contain some additional data which can be used to determine whether the data read from the data storage has remained unchanged.

Traditionally, checksums are calculated for blocks of data to ensure data integrity. For example, when saving each block on the hard disk, a checksum is calculated at hardware level and stored to the disk with the block. When the block is read from the disk, also the checksum is read. If it does not match with the other data in the block, it indicates a fault in reading or writing the data. For this purpose a CRC checksum is commonly used.

When a block data storage is encrypted, an encrypted block takes the same space as unencrypted block. Thus, there is no space in the blocks for any such extra data, which would ensure the success of encryption and decryption.

Sixth, let's study calculating a digest.

A digest identifies data content with a smaller amount of data than the original data content has. A good digest has a property, that, no matter how similar two different data blocks are, the blocks don't produce the same digest. A good digest has also a property that checksums have uniform distribution over the available number space.

Traditional checksum is calculated in a linear manner with sum and multiply operations, which results that some information from the actual block content can be derived from the checksum. If, for example, the checksum is the sum of data elements, and one data element is missing, it can it be calculated from the remaining data and the checksum. In most cases, such as in database hash tables, this property does not matter, and in some cases, such as in error correction, it is even beneficial. But there are also applications where the checksum should be such that it does not disclose anything from the data from which it has been calculated.

Secure digest (secure hash) checksums can be generated by using non-linear transformations, where the transformation can be used one way only. In this case it is possible to calculate a checksum, which cannot be used to restore the actual data. SHA-256 and RIPEMD-160 could be mentioned from the commonly used methods. These are generally considered as good digests.

Seventh, let's study the use of a hash table.

Hash table is a commonly known search structure, the data structure associating keys to values. Good sources for the use of hash tables can be found in the publications Donald E. Knuth: Art of Programming, Volume 3: Sorting and Searching (2nd edition, Addison-Wesley, 1998, ISBN 978-0201896855) and Cormen, Leiserson, Rivest and Stein: Introduction to Algorithms (MIT Press, 2003, ISBN 978-0262032933).

When a key (for example, the person's name) is given to a hash table, it returns the value (phone number). Internally it creates a digest from the key, from which an index is derived to a table of values.

Figure 1:
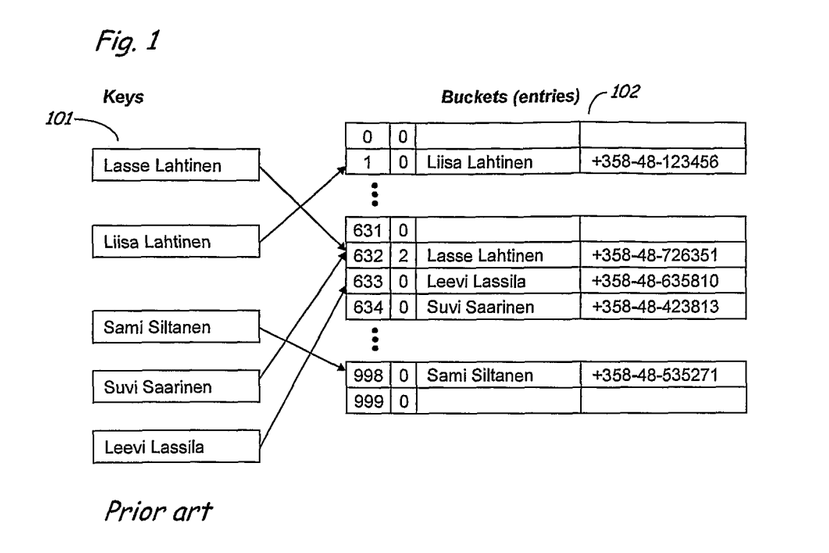
FIG. 1 shows the method to index the keys according to prior art.

In an example presented in drawing 1 a digest 632 is calculated from the name "Lasse Lahtinen", 1 from the name "Liisa Lahtinen" and 998 from "Sami Siltanen". These digests are used as a hash table indexes. In the hash table bucket of the corresponding index there is the name and telephone number. This principle works smoothly as long as the hash table has free buckets.

Eventually the hash table becomes so full that two names have the same digest. To handle this kind of a collision, a number of methods have been developed, from which one is presented next: Drawing 1 illustrates a method which is based on linear probing, in which, when the collision occurs, the next available record in the hash table will be taken into use. It is beneficial to have a field in the hash table records which in a way or other indicates how far the correct record may have to be searched. In this example, "Suvi Saarinen" has the same digest 632 than "Lasse Lahtinen", but the next record 633 is already reserved for "Leevi Lassila". Because the record 634 is free, "Suvi Saarinen"'s data will be placed there, and number two is saved to the record "Lasse Lahtinen" corresponding to the digest, because two is the maximum search distance 634 minus 632.

Performance of linear probing is known to degrade when the hash table is becoming full. The problem can be moderated by making the hash table somewhat larger than the minimum required size, for example 20%.

Eighth, let's study web servers.

Internet access is now available to almost everywhere, but the connection is not necessarily broadband. Secure communication protocols have been developed for IP data transmission (Internet Protocol) between computers, for which open source libraries can be found. For example, the open source OpenSSL library provides support for SSL/TLS protocols.

Ninth, let's study creating a data storage to an operating system.

For example, in a Linux operating system, a local data storage may be created as a network drive: a generally known Network Block Device (NBD) can be mounted in a way that it listens to a local IP address. Data storage is then located in the same machine, and NBD makes it possible to process the files as data blocks regardless of the file system.

Figure 2:
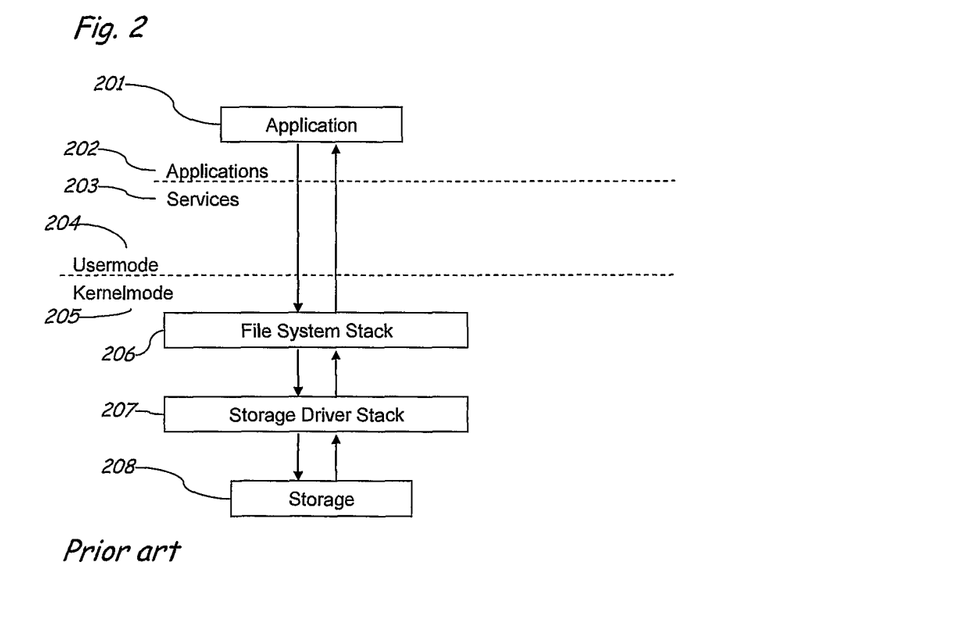
FIG. 2 shows one arrangement to implement the file system according to prior art.

Drawing 2 presents a model related to Windows operating systems, how applications (201), such as Microsoft Word, write files to a data storage (208). Broadly speaking, the file system stack (206) processes data as part of files, while data storage driver stack (207) processes data as blocks. Applications (202) and part of the operating system services (203) in Windows operating systems operate in user mode (204), while most of the drivers are in kernel mode (205).

Data storage may be a physical storage device such as a disk or tape drive, or logical volume, such as a file created by open-source TrueCrypt software. The file created by TrueCrypt appears as a local drive to the computer when it is opened with TrueCrypt software. That file can of course be the physical size of the memory capacity of the device and the only file in it.

TrueCrypt teaches to a person skilled in the art how disk blocks are encrypted, for example with the Windows kernel programming. Nowadays TrueCrypt uses XTS-AES encryption standard. TrueCrypt is an open source example of driver software placed to the driver stack (204) of data storage.

OBJECTIVES OF THE INVENTION

One primary objective of the invention is to improve the security of the stored data by encrypting the data, advantageously so that the user does not need to create a password or phrase.

One secondary objective of the invention may be to improve the data preservation by creating a consistent data storage content version control, i.e. easy procedure to restore the previous state of the data storage.

Still one secondary objective of the invention may be an improved data security by creating a hidden volume, whose existence may be revealed selectively to only some of them who have access to the entire data storage (selective deniability).

Still one of the secondary objectives of the invention may be creating a company level or community level data security, in which the existence of the hidden volume can be detected only by the owner of the encryption system.

Still one of the secondary objectives of the invention may be increasing lifetime of a SSD memory device.

Still one of the secondary objectives of the invention may be to improve the reliability of the data by process, with what the encrypted data integrity can be reliably verified.

A BRIEF DESCRIPTION OF THE INVENTION

Invention is used for storing data to at least two memory devices, of which the first may be SSD-based. The first memory device has a series of numbered data blocks, and it is connectable to a first computer, for example, a Linux workstation.

One aspect of the invention is a method for writing data to a memory device arrangement comprising a first and a second memory device in which the first memory device comprises data blocks numbered with block numbers and the second memory device comprises at least one reference calculated from a data block digest and its physical block number. The method is characterized in that it comprises the following steps: calculating the digest from at least part of the data block content, determining or receiving at least one physical block number, to which the data block contents in the first memory device is stored, encrypting the data block content, storing the data block content to the first memory device to the position pointed by the physical block number, storing or issuing a command to save the said digest, or a number derived from it, and at least one said physical block number to the second memory device.

The first memory device may be connectable to a first computer and the second memory device may be connectable to a second computer. Connecting may be done, for example through the computer bus or a suitable computer network.

The location where the digest or a number derived from it, and a physical block number, is stored, may be derived for example from the data block digest.

The method may also contain the steps to connect the second computer to the first computer for example, through a data network, such as TCP/IP protocol network, and to authorize this connection either on the basis of the said first computer, of the user of the first computer or of the mentioned first memory device.

The second memory device may include a table, whose elements are assigned on basis of the logical block number.

The second memory device may include a table that includes the physical block number of the first memory device.

Data block contents may be encrypted by using at least one of the following for the encryption: a separate key, said digest and said physical block number.

When updating the data block already stored in the first memory device the data block may be written to a different address than where the previous version of the data block residing in the memory devices is located.

If two different data block digests are exactly the same, the data block may be in some embodiments be written to the first memory device only once.

Second aspect of the invention is a system for writing data to a memory device arrangement comprising a first and a second memory device in which the first memory device comprises data blocks numbered with block numbers and the second memory device comprises at least one reference calculated from a data block digest and its physical block number. The system is characterized in that it comprises means for calculating the digest from at least part of the data block content, determining at least one physical block number, to which the data block contents in the first memory device is stored, encrypting the data block content, storing the data block content to the first memory device to the position pointed by the physical block number, storing said digest or a number derived from it and at least one said physical block number to the second memory device.

Third aspect of the invention is a computer program for writing data to a memory device arrangement comprising a first and a second memory device in which the first memory device comprises a plurality of data blocks numbered with block numbers and the second memory device comprises at least one reference calculated from the data block digest and its physical block number. The computer program is characterized in that it comprises computer executable instructions for performing the following functions: calculating the digest from at least part of the data block content, receiving at least one physical block number, to which the data block contents is stored in the first memory device, encrypting the data block content, storing the data block content to the first memory device to the position pointed by the physical block number, storing or sending a request to store said digest or a number derived from it and at least one said physical block number to the second memory device.

Fourth aspect of the invention is a server computer which comprises a second data storage comprising information about the data blocks located on the first data storage, which first data storage is communicatively connectable to the server computer and which information comprises the digest formed from the data block, virtual address of the data block and physical address of the data block. The server computer is characterized in that it comprises computer executable program code comprising the commands to execute the following functions: receiving a request which contains the virtual address of the data block in the first data storage, determining the physical data block address corresponding with the virtual address, and the value of the digest using the second data storage data, and sending a reply containing the physical address of the data block in the first data storage and the digest.

A DETAILED DESCRIPTION OF THE INVENTION

FIGS. 1 and 2 illustrating the prior art are explained in "Background of the invention" section. Next the invention is explained with its different embodiments and illustrations drawn about them.

Figure 3:
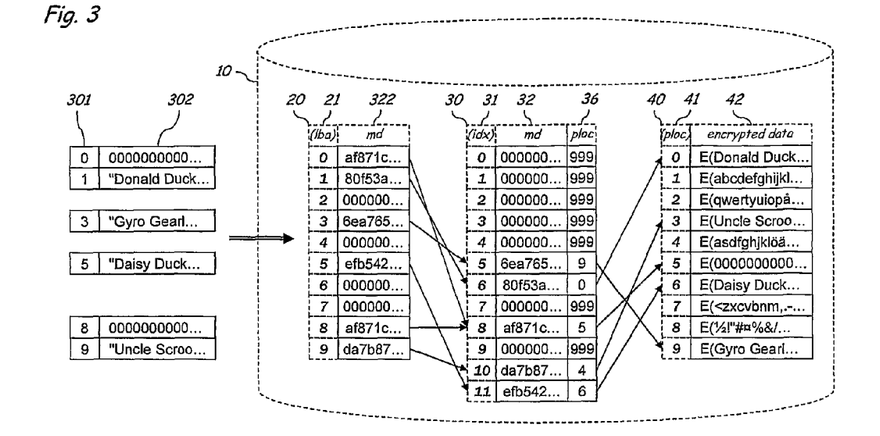
FIG. 3 shows an arrangement according to an embodiment of the invention.

At first let's examine drawing 3 which shows saving of data to a logical volume (10) according to an embodiment of the invention. When saving the data to some logical address (301) a digest is calculated (322) at least from part of the data block contents (302) and at least one physical block number (41) of the first memory device (40) is defined, to which the data block contents after decryption is stored. So, in principle, the data is not stored in accordance of its logical block number (301), but to location pointed by the physical block number (41) which is determined from the digest (322).

In this context it should be noted that the terms "physical memory device" (40) and "physical block number" (41) are henceforth used for clarity: "physical memory device" (40) may in fact be any block data storage, and "physical block number" (41) a logical block number, which is used for addressing data storage blocks.

Further it should be noted that the example presented in the drawing 3 is still simplified, and does not offer the advantages of the invention. It works as long as in the hash table (30) no collisions occur.

To the second memory storage device, such as an external server, are stored the said digests (32) and said first memory device physical block number (36). This data structure (30) is advantageously implemented as a hash table.

Figure 4:
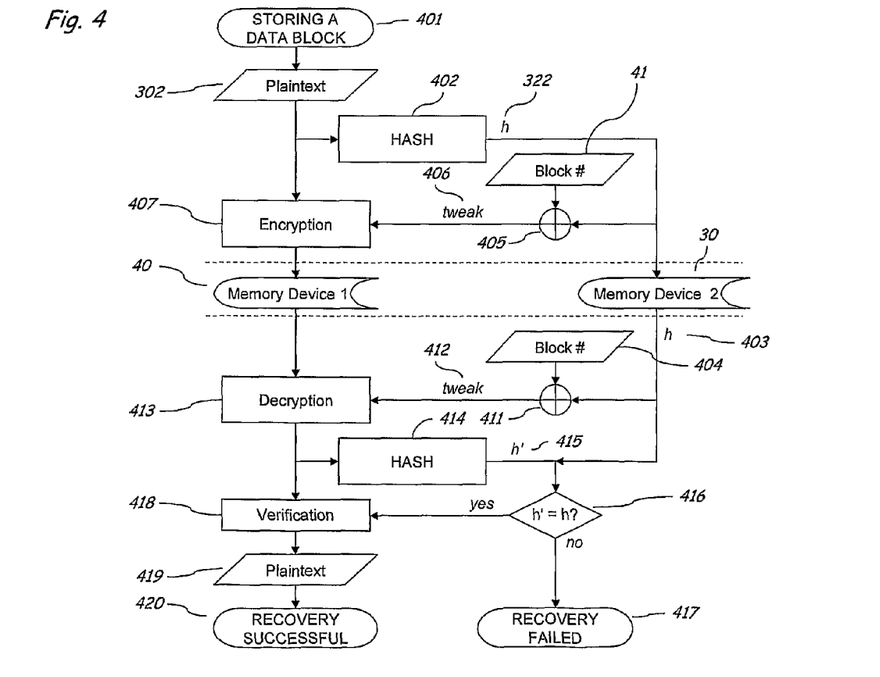
FIG. 4 shows a method according to an embodiment of the invention.

In the invention data may be encrypted by using a data block digest as a XTS-AES tweak. Let's look the drawing 4. Data block is plaintext (302). When saving the data block (401), the digest h (322) is calculated (402) from it. To this digest is attached a physical block number (41) using for example an exclusive or operation (405), this modifier term (406) will be used as XTS-AES's tweak and encrypted the plaintext with XTS-AES (407):

$$C \leftarrow \text{XTS-AES-Enc}(Key, P, h \oplus ploc), \quad \text{(iv)}$$

where C is the data content to be recorded to a block (42) of the first memory device (40), Key is the key, P is the data content (302) to be recorded to a block of the memory volume (10) of the invention, h is its digest (322) and ploc is the physical block number (41) of the first memory devices (40). Digest is stored to the second memory device (30).

The Key may be generated from a random number and it may be a memory device-specific.

When reading data from a specific block (404)' of the memory volume (10) of the invention, the data content digest (403) will be read from the second memory device (30), a physical block number (404) will be attached to it with an exclusive or—operation (411), this modifier term (412) is used as XTS-AES's tweak and the encryption is decrypted with XTS-AES (413):

$$P \leftarrow \text{XTS-AES-Dec}(Key, C, h \oplus ploc), \quad \text{(v)}$$

After this, the accuracy of the restored plaintext may be checked by calculating the restored plaintexts' digest h' (414) and comparing (416), whether $$h' = h \quad \text{(vi)}$$

is true. If it is, the data block plaintext (419) has been restored successfully (420), otherwise it will be noted that an error (417) occurred.

These measures will help to ensure the integrity of information. When hiding the data—whether done with XTS-AES or with any other procedure—a fixed or a system defined number or some number which is based on the user's input, may be used as keys. Processing encryption keys may be carried out with methods known to a person skilled in the art.

When in the example the data block is stored, a hash table index will be calculated using some known hash table method from the digest of its content. If the encryption was made as described above, the digest is already been calculated.

An exemplary embodiment of the invention shows in the workstation as a logical volume (10) consisting of blocks, and in which the data (302) may be written and from where it can be read on the basis of the logical block number (301). The data structure of the example has three tables:

In the following, the first memory device (40) is referred to as physical data storage. It may be any block-data storage, for example a flash memory, whose records, i.e. block contents (42), the data to be written to the logical volume (10) is stored to, advantageously in encrypted form. Physical data volume blocks must also have some kind of a mechanism to identify the free blocks. There are a number of simple procedures, such as the tabulation of the free blocks or a FIFO-type buffer, from the beginning of which the next free block number is picked up and to the end of which the numbers of the freed blocks are placed.

The second memory device of the example comprises a hash table (30), whose records have references (36) to the blocks of the physical data storage (40). Free hash table volumes may be marked for example by assigning as reference a number (36), which is greater than the number of blocks in the data storage.

In addition, there is a redirection table (20) in the example, which is often advantageous to be located at the second and in which all block read and write operations are referring to, although it can of course also be located in the first or some other memory device. The structure of the redirection table has a block data content digest (322), from which the hash table volume index (31) is calculated. The number of the redirection table records is advantageously the same as the externally visible number of blocks of the logical volume (10).

In the example, read and write operations thus refer to a redirection table (20) records according to the logical block number (301) defined by the file system.

If the width of the digest (322) of the is large enough, say 128 bits, the elements of the redirection table (20) already in use may be identified from that the digest (322) is assigned a specific number, for example a zero: Probability to this number becoming as digest is minimal, in this example $2^{-128}$.

In the write request a logical block number (301) and block's data content (302) is given the memory device (10) of the example. Logical block number (301) is used as the index (21) of the redirection table record, where the digest (322) calculated from the data content (302) is stored (322). On basis of the same digest the hash table record index (31) is calculated, where the index (36, 41) of a free physical data storage block is written. Finally the data content (302) of the write operation is stored as the content of this physical data storage block (42), preferably in encrypted form.

In a read request, a logical block number, whose data content needs to be read, is given to the memory device (10) of the example. Logical block number is used as the index (21) of the redirection table, from where the digest is read (22). On basis of the digest, hash table's index (31) shall be calculated, from where a reference to the physical data storage block (36) is retrieved. The index is calculated in the same way as when processing the write request. Finally, the content of the physical data storage block (42) is read and returned as a response to the read request.

It should be noted that data is removed from the block data storage only in the case of overwriting. This happens also in the memory device (10) of the example:

Data is removed from the memory device (10), when the redirection table record, whose index (21) is the logical block number (301) given in the write request, is already in use. The existing digest is read (322) from the relevant record. Based on the digest, the index (31) of the hash table is calculated, from where the reference to the physical data storage block (36) is fetched in the same manner as when handling a read request. This block number of the physical data storage (41) is released. Also the hash table record in question is released.

In the example of FIG. 3, two writable blocks have the same data content (302), namely the blocks 0 and 8 contain only zeros. Both have the same digest (322), so they are pointing to the same hash table (30) record, with the index value (31) 8. The data content must have been written only once to the physical data storage (40), to the block 5. In the example the writing of identical blocks saves disc space and speeds up the writing operation, because the slow disk writing does not always need to be done.

Figure 5:
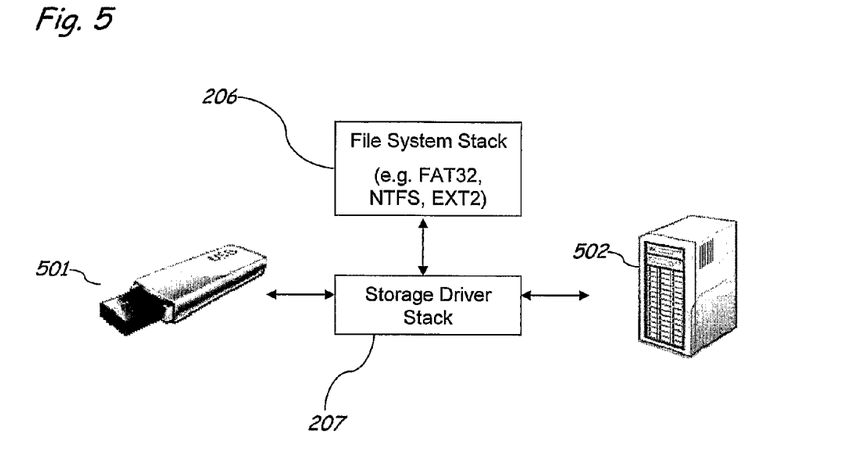
FIG. 5 shows a graph about the components of an embodiment of the invention.

It should be noted, that, for clarity, table indexes (21, 31 and 41) have been presented in drawings, although they are not really compulsory in the implementations. Above and not in the drawing 3 have not been presented necessary data structures' for the hash tables' collision handling. About those the following example is presented:

One preferred embodiment of the invention (drawing 5) relates to the SSD memory device protection (501), which is the inventions' first memory device. The second memory device is a network server (502). This processing form may be implemented for example to the operating systems' driver stack (207), which is located below the file system drivers (206).

Figure 6:
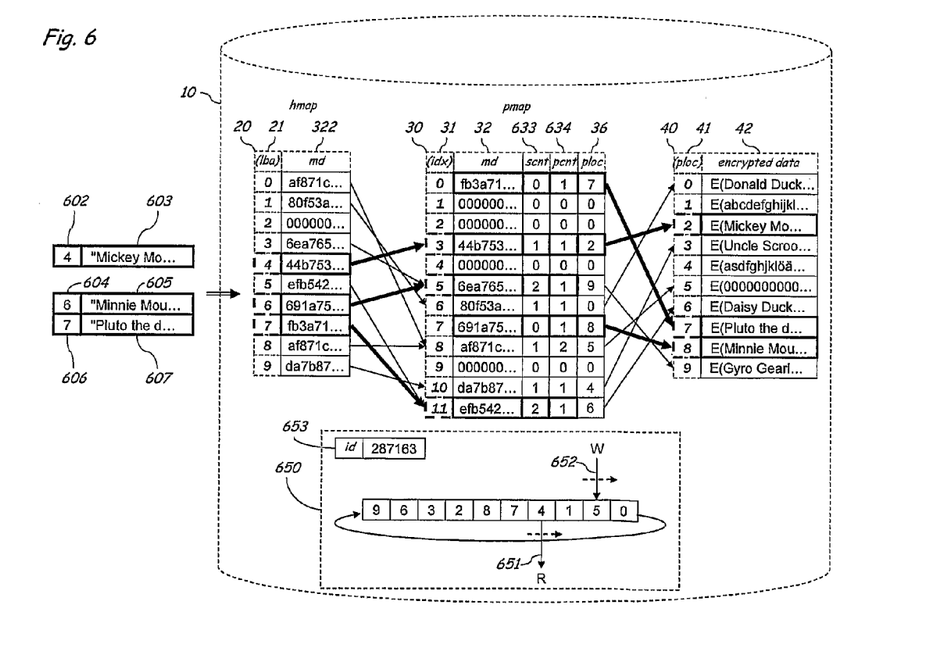
FIGS. 6-8 show details of some arrangements according to some embodiments of the invention.

Let's look into the FIG. 6. In a preferred embodiment of the invention the redirection table (20), hash table (30) and information about the free blocks of the physical data storage (650) is stored to the network server, where as the physical data storage (40) is in the SSD memory device.

In a preferred embodiment of the invention the digest is calculated with a RIPEMD-160 method, which 160-bit result is used the first 128 bits. In accordance of the birth date paradox the same digest is created from the two blocks containing same content likely only after writing $2^{64}=1.845\times 10^{19}$ blocks. If this is not deemed enough, a digest having more bits may be used.

Hash table data structure is defined in the pmap-data structure:

```
typedef struct {
    md_t md;         // block digest
    uint64_t pcnt;   // references to physical address
    uint64_t scnt;   // number of references to the record
    uint64_t ploc;   // physical block number
} pmap_t;
```

Where md_t is the data structure including the digest, in the example a 128-bit integer.

In the one preferred embodiment, the free blocks of the physical data storage are registered to a free blocks ring buffer rngg (650), which is initialized with block numbers of the physical data storage. The block numbers in the ring buffer block may be in random order, and not all of them have to be used. To those physical block numbers, which are not initialized to the ring buffer, may be placed a hidden volume. This feature will be studied later.

So in the ring buffer there is in the beginning a list of all non-hidden physical data storage blocks. Read pointer (651) is in the beginning of the ring buffer and because the buffer is full, the write pointer (652) is immediately before it, in other words in last element of the buffer.

Next free block of the physical data storage is read from the location indicated by the read pointer, and the read pointer rqtop (651) is moved to the next element. When a block in the data storage is released, its number is written to the location indicated by the write pointer rqend (652) and the read pointer is moved to the next element. Since the number of elements in the ring buffer is the same as the number of blocks in the physical data storage, and because no data storage block is released twice without having being meanwhile reserved, the space in the ring buffer never runs out. As a pseudocode, the reading of the next free block in the physical data storage (new_block) happens as follows:

new_block=rngq[rqtop++];
if (rqtop>=n)//continue from the beginning rqtop=0;
where n is the size of the ring buffer (650). Released blocks of the physical data storage are written to the ring buffer accordingly:
rngq[rqend++]=old_block;
if (rqend>=n)//continue from the beginning rqend=0;

In this context two aspects should be taken into account: First, the most recently released blocks of the physical data storage are last to become reserved. The version control of the last states, in other words in practice the restoration of the previous state may be implemented in several efficient ways, which will be studied later. Secondly, even if in the initialization the ring buffer gets all the block numbers of the physical data storage, the same numbers might repeat again and again in the ring buffer after being in operation.

Using the most recently released blocks last allows also an even recycling of the free blocks of the SSD flash memory device, which extends substantially the lifetime of the device.

In one preferred embodiment the number of records in the redirection table (20) is the same as the number records in the physical data storage (40).

When a hash table element corresponding to a digest (322) is searched, the search begins from the point, which is interpolated linearly from the number of records in the hash table (30):

```
uint64_t slot(h) {
    return *((uint64_t *) h) / d;
}
``` where h is the digest, and $d=2^{64}/(1.2*n)$ is selected in an embodiment so that the number of records of the hash table is 1.2-times by the number of the records in the physical data storage (10 in the example of the FIG. 6).

In a preferred embodiment, pseudocode of the search function find_by_hash( ) is

```
s = slot (h)               // start record
c = pmap [s]. scnt;        // search counter
i = s;                     // index
while (c > 0) {
    if (h == pmap[i].md)
        return i;
    // same record?
    if (slot(pmap[i].md) == s)
        c--,               // decrement the search counter
    if (++i >= pmapsiz)    // continue from the beginning
        i = 0;
}
return NOT_FOUND
``` where information about, how many digests (322) stored to the data structure point to that element (search distance), is maintained in the scnt element of the pmap data structure. It is used as a basis for concluding, when it is no use to continue the search.

When writing a data block (603) into a logical block number i (602) a physical block number (41) will be searched for it as follows:

```
h = hash (block);                       // calculate digest
if (hmap[i] != NOT_USED) {
    if (h == hmap[i])                   // same content again?
        return;                         // do not need to save
    j = find_by_hash (hmap [i]);
    // release the hash table element?
    if (--pmap[j].pcnt == 0) {
        pmap[slot(hmap[j])].scnt--;
        rngq[rqend++] = pmap[j].ploc;
        if (rqend >= n)                 //continue from
            rqend = 0;                  // the beginning?
    }
}
```

```
// set new redirection table element
hmap[i] = h;
// process the hash table
j = find_by_hash (h);
if (j != NOT_FOUND) {                   // is the same content stored?
    pmap[j].pcnt++;                     // The number of reterences to
    the record
    return;                             // do not need to save
}
s = slot(h);                            // start record
pmap[s].scnt++;                         // is a new record
j = s;
while (pmap[j].pcnt > 0) {              // search free
    if (++j >= pmapsiz)
        j = 0;                          // continue the search from the
                                        // beginning
}
pmap[j].md = h;                         // store the digest
pmap[j].pcnt = 1;                       // the number of references
                                        // starting at 1
pmap[j].ploc = rngq[rqtop++];           // find the physical
                                        // volume block
if (rqtop >= n)                         // ring buffer read pointer
    rqtop = 0,                          // start from the start
``` where pmapsiz is the number of records in the hash tables (30), n the number of records in the ring buffer (650) number of records and pmap[j].ploc (36) the block of the physical data storage (40) which is written, unless the function is interrupted with return. When interrupting with return a block with the same content has been stored already, and there is no need to save the same block twice.

When reading the block, a physical block number is obtained in a considerably more straightforward manner:

p=find_by_hash(hmap[i]);
return pmap[p].ploc;

where pmap[j].ploc (36) is the block of the physical data storage (40) which is read.

For clarity, the number of references to the hash table will not be discussed hereafter, nor are discussed any implementation techniques relating to hash tables known to a person skilled in the art.

Let's continue studying FIG. 6, and the functionality of some embodiments.

In the example, the size of the hash table (30) is 12 records, and digests are divided equally among all the records in order. Equal division is justified because secure hashes produce an uniform distribution that is independent from the content. As a result the digests 000000 . . . -14ffff . . . point to the first record, 150000 . . . -29ffff . . . to the second, -300000 . . . -3effff . . . to the third and so on, the last record belonging to the digests e70000 . . . -ffffff . . . .

The digest of the written data (32) is the digest of the content which is written to the physical data storage (40) block corresponding to the reference (36).

Let's study further FIG. 6 and writing a new block in six example cases.

In the beginning of the example in FIG. 6, the blocks of the redirection table (20) having index values (21) 0, 1, 3, 5, 8 and 9, hash table (30) records as index values (31), 5, 6, 8, 10 and 11, and the blocks of the physical data storage having numbers (41) 0, 3, 5, 6 and 9 are already being used. The initial state corresponds to FIG. 3, and FIG. 6 itself describes the final state.

In the first write example, no collision is taking place. A logical block number (602) 4 is given in the write request, and the data content (603) which will be written to it. The digest 44b753 . . . is calculated from the data content and placed to the redirection table record having index value (21) 4. The digest in question belongs to the hash table record having index (31) 3. Because the record in question is free, i.e. its reference count (634) is initially zero, it can be taken into use. After that a free physical data storage block number, in the example 2, is retrieved from the ring buffer (650), and stored as a pointer (36) to the block of the physical data storage (40) in the hash table record, and the data content is written (603) to the block in the data storage (42) preferably with encryption.

In another write example, a collision occurs. In the write request a logical block number 6 (604) is given, and data content (605) which will be written to it. A digest 691a75 . . . is calculated from the data content and placed to the redirection table record having index 6 (21). The digest in question belongs to a hash table record having index 5 (31), whose reference count is already one (634), so it is in use. Also the next hash table record, having index value 6, is in use, but 7 is free.

The digest of the data content is written to the hash table record having index value 7 (31). After this, the block number of a free physical data storage block, in the example 8, is retrieved from the ring buffer (650), and stored as a pointer (36) to the block of the physical data storage (40) in the hash table record, and the data content (603) is written, preferably with encryption, to the block of the data storage (42).

Also in the third write example, a collision occurs. In the write request a logical block number 7 (606) is given, and the data content (607) which will be to it. The digest fb3a71 . . . is calculated from the data content, and placed to the redirection table record having index value 7 (21). The digest in question belongs to the hash table record having index value 11 (31), whose reference count (634) is already one, so it is in use. It is the last hash table record, so the search is continued from the record having index value 0, which is free.

The digest is written to the hash table record having index value 0 (31). After this the block number of a free physical data storage block, in the example 7, is retrieved from the ring buffer (650) it is stored as a pointer (36) to the block of the physical data storage (40) in the hash table record, and the data content (603) is written, preferably with encryption, to the block of the data storage (42).

Figure 7:
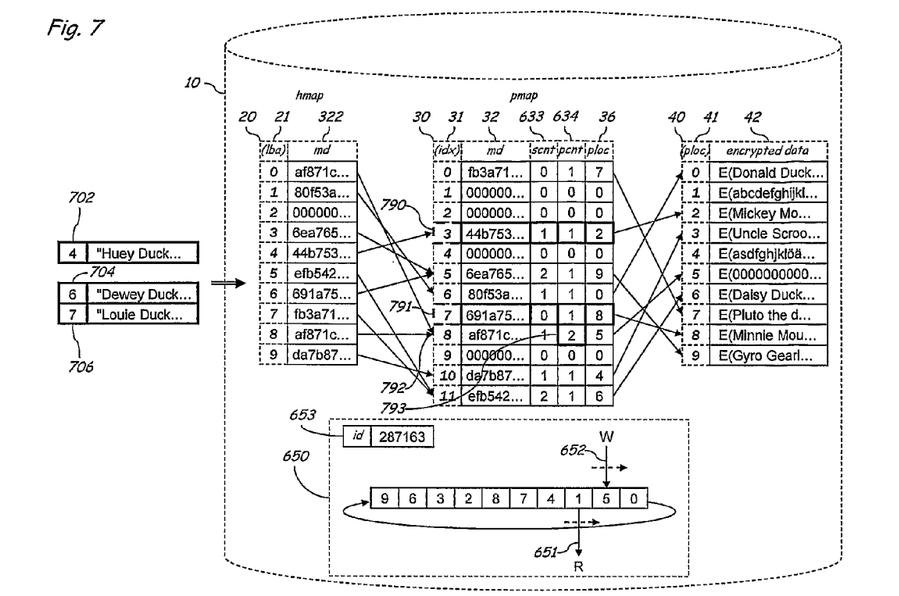

Let's look into FIG. 7, in which the state of the logical volume (10) is where it was left after the previous write examples. Thus the figure presents an initial state. In the FIG. 7 three additional write examples are illustrated, in which the blocks of the logical volume (10) to be written to are already in use. In these examples those same blocks are written again, which were written in the previous three write examples.

In the fourth write example, a write request (702) to the block number 4 of the memory volume (10) is issued, which block number is used as an index of the redirection table. The redirection table record having index value 4 points already to the hash table record having index value 3 (790), whose digest (32) matches with the digest (322) of the same record of the redirection table. Only one record of the redirection table (20) refers to the hash table record in question (790). The reference count (634) of the hash table record (790) is decremented by one, so the number of references reaches zero, and the record having index value 3 (790) is therefore released. At the same time, the block number 2 of the physical data storage, to which in the hash tables record (790) is pointing at, is released by writing value 2 to the FIFO-type ring buffer containing the free blocks (650). After this, the actual write operation will be carried out, as described in the write examples 1-3.

The fifth write example presents a write request (704) to the block 6 of the memory volume (10). The record of the redirection table having index value 6 points already to the record of the hash table having index value 5, whose digest (32) does not match with the digest of the redirection table record (322). In this case, the hash table collision is resolved with linear probing, until a right hash tables record having index value 7 (791) is found. Because more than one records of the redirection table (20) refers to the hash table record in question (791), the process continues as in the fourth write example with the record (790) having index value 3.

In the sixth write example a write request (706) is issued to the block 8 of the logical memory volume (10). The record of the redirection table having index value 8 points to the hash table record having index value 8, whose digest (32) matches with the digest (322) of the redirection table record digest. Two redirection table (20) records refer to the hash table record in question (792). At first the reference count (793) of the record in question is decremented by one, after which the actual write operation is carried out as described in the write examples 1-3.

Figure 8:
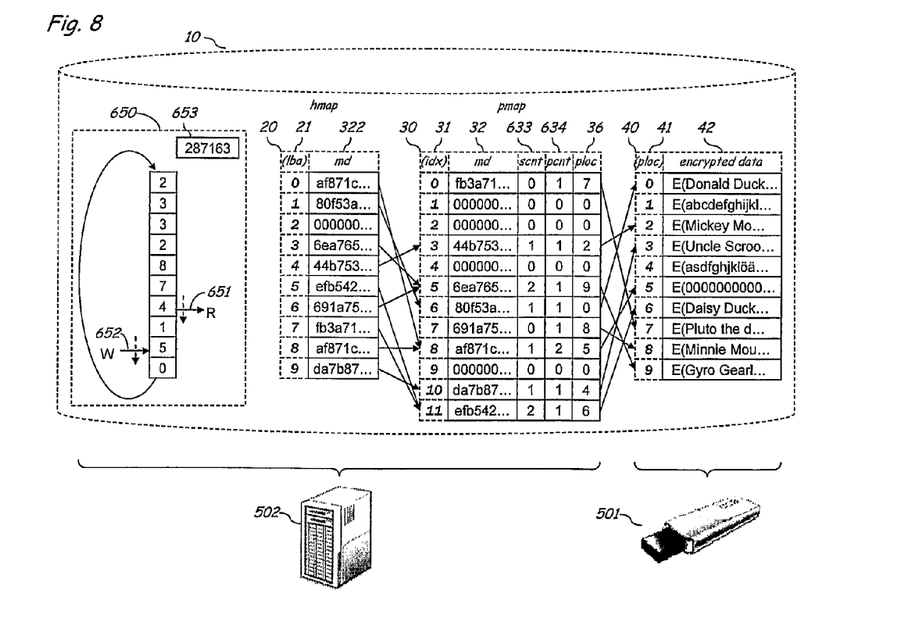

Let's look into FIG. 8: SSD memory device and the server.

In one preferred embodiment a volume having the size of the memory device is created to the SSD-memory device (501) with a version of a driver software implementing the invention. After processing, the driver software writes ciphertext, the opening of whose needs small amount of data from the network server (502), to the blocks of the files it has generated.

Figure 9:
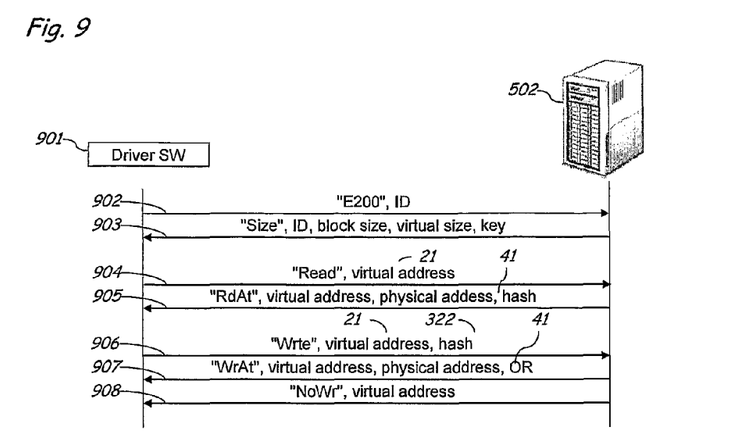
FIG. 9 shows exemplary call diagrams between the driver software and server according to an embodiment of the invention.

When the redirection table (20), the hash table (30) and the FIFO-type ring buffer of free blocks (650) are stored to the network server, the read and write operations can be implemented in a server assisted manner:

Let's look into FIG. 9 and data communications.

In one preferred embodiment, a connection opening request (902) along with the unique identification number 504 of the first memory device is sent to the server when opening a connection. As a response (903) the server returns the number of records of the redirection table corresponding to the unique identification number, the size of the storage blocks and an encryption key. After this the volume can be said to be active.

In the write operation, a request (906), which includes the number of the block to be written to the logical volume (10) and the digest of the contents of the data (322), is sent from the driver software (901) to the server (502). As a response the server returns either (907) the physical block number (41) or (908) information that a block with a similar content, in other words a block having an identical digest already exists in the physical data storage (40).

If the server returns the physical block number (41), an encryption is carried out as described above (formula iv) using a key returned by the server. Finally, data is stored to the physical memory storage.

If the server returns the information (908) that a block with same content already exists in physical data storage (40), it does not need to be saved again.

In a read operation a request (904), in which there is the block number (21) to be read from the logical volume (10), is sent from the driver software (901) to the server. As a response (905) to the request the server returns the physical block number (41) and the digest of the data content (322). Encrypted data content is read and decrypted as described above (formula v) with the key returned by the server. Finally, the integrity of the content is checked as described above (formula vi).

It should be noted that in FIG. 9, the responses to the read and write operations (905 and 907) contain the logical block number, as well as with the connection request reply (903) the volume identifier is returned. If the driver software (901)

expects responses to more than one request, by using them it is possible to identify which response belongs to what request. A person skilled in the art may easily implement other ways, too, to associate requests and responses.

In a preferred embodiment SSL protocol is used as a transport protocol, and the driver software or the user is identified with one of commonly known methods in https, such as password, certificate, or a smart card, allowing a server to authorize the driver software to establish the communication.

Figure 10:
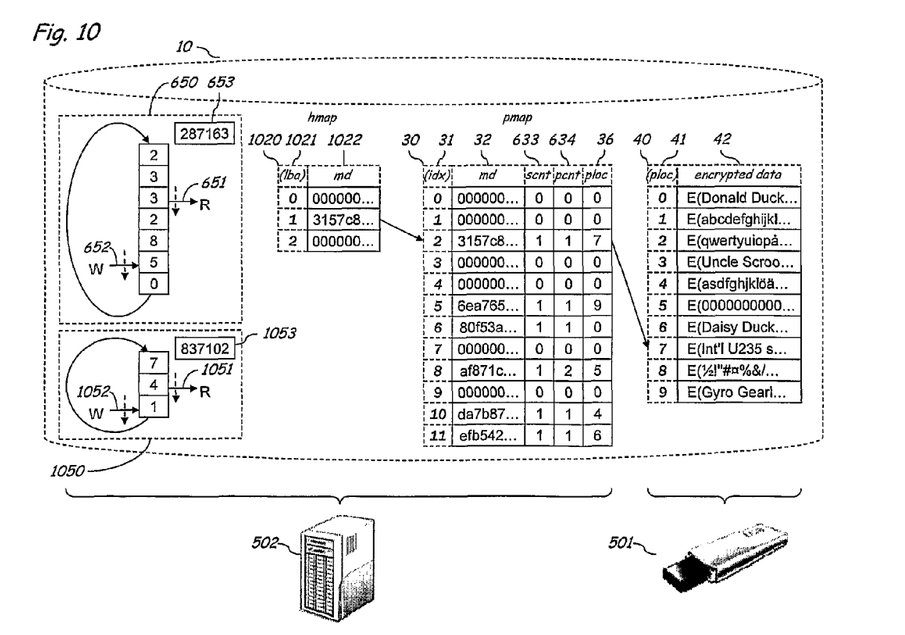
FIG. 10 shows an arrangement for implementing a hidden volume according to an embodiment of the invention.

Let's look into the FIG. 10 and the implementation of the hidden volume.

One way of implementing the hidden volume is presented in the FIG. 10. Ring buffer (650) does not contain all of the records of the physical data volume, but part of the free records has been transferred to the ring buffer (1050) of the hidden volume. When, while creating a connection, the identification number (1053) of the hidden volume is given to the server, the server deploys the ring buffer (1050) and redirection table (1022) of the hidden volume instead of the normal ring buffer (650) and the redirection table. In the response (903) of FIG. 9, the parameters of the hidden volume are given to the driver software (901).

Particularly when using the hidden volumes the encryption key is advantageously volume, not memory device specific. It can be generated from a random number when the volume is created, in which case the user does not need to enter a password to the volume.

From the implementation point of view it is advantageous if the blocks of the physical data storage are placed in the ring buffer (650, 1050) of the volume which is active at the moment, when the blocks are released.

In this context it should be noted that although an example of the hidden volume implementation was presented above, a similar procedure can create to the same logical volume (10) for many users with their own volumes, of which some may be visible to other users, but not necessarily all.

In the example of FIG. 10, data belonging to a hidden volume is stored in encrypted form to block 7, the existence of which data can not be concluded without access to the data structures of the server (502). Thus the existence of the hidden volume can not be denied from the holder of the server—for example from the employer—but it can be denied from third parties.

It is noteworthy about the hidden volume that, because the blocks with identical content are stored in the physical data storage (40) only once, free blocks that may be used for a hidden volume are likely to exist. In this case, in the FIG. 9, response (903) needs to report a lower number of redirection table records than the number of blocks in the physical data storage (40).

Figure 11:
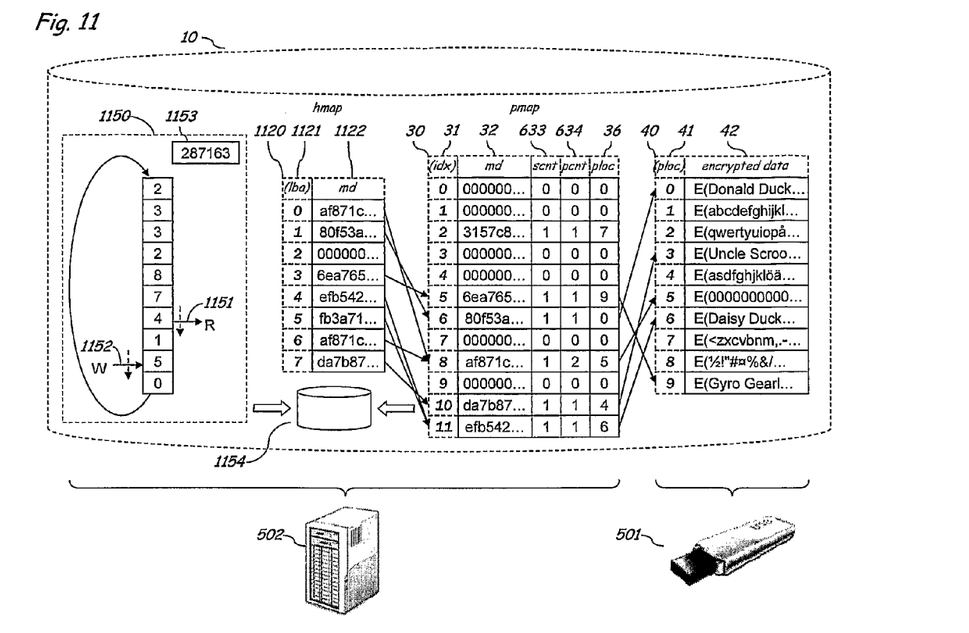
FIG. 11 shows an arrangement for implementing data versioning according to an embodiment of the invention.

Let's look into the FIG. 11 and the version control.

Since the most recently released physical block number (1152) from the ring buffer is last to be taken into use, the contents of the deleted blocks will remain (42) stored even after the deletion. If a backup copy is taken from time to time from the ring buffer (1150) and the hash table (30) to a separate volume (1154), restoring merely that backup copy restores the earlier state of the whole data volume (10) of the invention.

The more free blocks there are in the physical data storage (40), the better are the chances of restoring the earlier state. The number of free blocks may be increased by creating fewer records to the redirection table (1120) than what the physical data storage (40) has. In this case, even from a fully written data volume (10) of the invention, it never happens that the most recently freed physical data volume block would be read (1151) from the ring buffer (1150).

Instead of or in addition to backups, numerous event handling and restoration techniques known to a person skilled in the art may be applied to the ring buffer (1152) and the hash table (30) updates.

Figure 12:
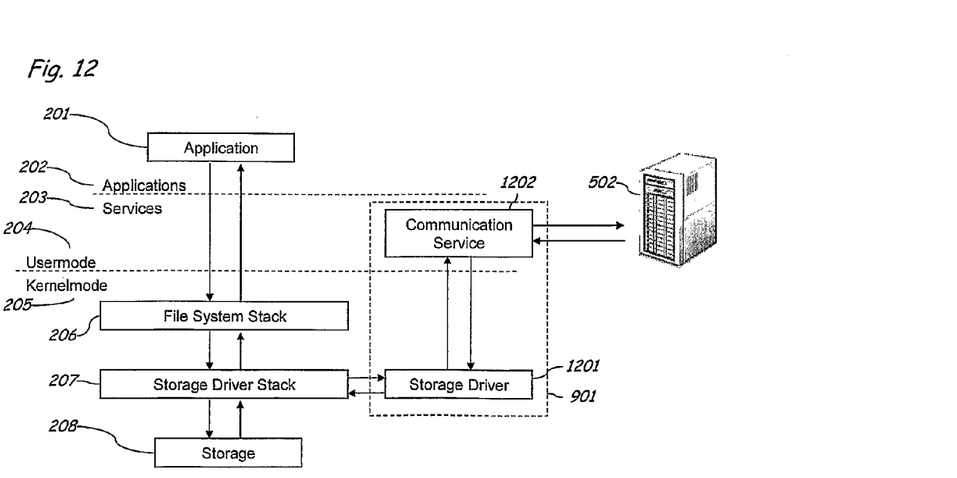
FIG. 12 shows implementation of an embodiment of the invention in Windows® environment.

Let's look into FIG. 12 and Windows™ implementation of the invention.

Use of the communication protocols from driver software, especially from Windows kernelmode software such as True-Crypt, is difficult, so for person skilled in the art it is probably easiest to implement a usermode communications software (1202) as a Windows service to complement the disk driver (1201) in IP communication required by the server (502). Data transfer between these kernel (205) and usermodes (204) is taught in Windows Installable File System Development Kit example project FileSpy.

Advised by its description and presented embodiment examples it is easy to implement different variations from the invention. For example hash table (30) and information about which physical data storage (40) blocks are free, can be implemented using a number of ways known in the art. In addition, for example, in the driver software implementation was presented one Windows™-based embodiment, but the invention may also be used in other architectures utilizing the inventive idea presented herein.

Figure 13:
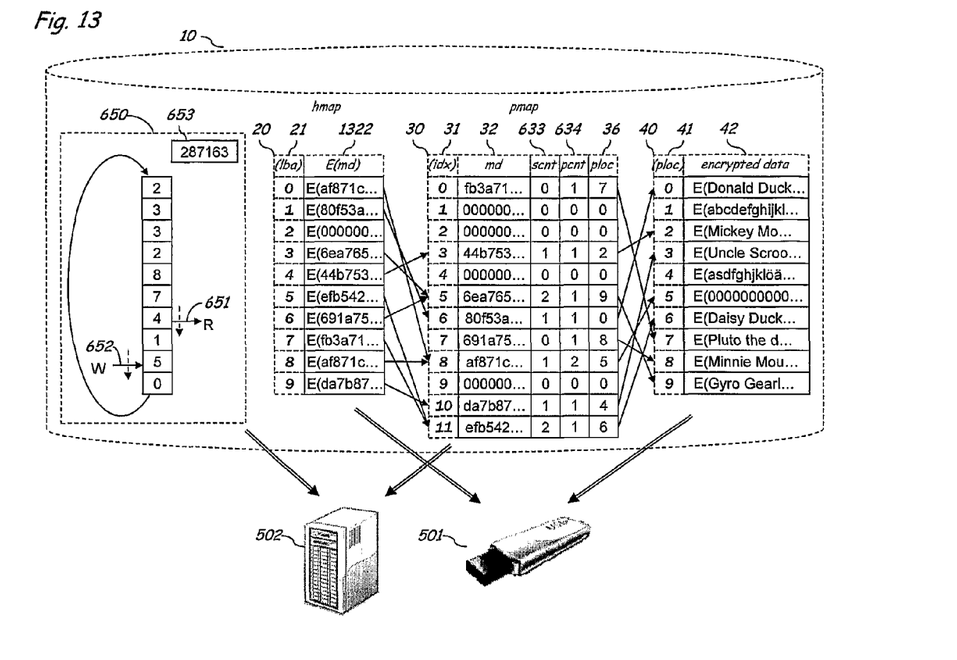
FIG. 13 shows an arrangement for placing the redirection table to the first memory device according to an embodiment of the invention.

Let's look with the FIG. 13 the placing of the redirection table (20) to the same physical memory device with the data storage (40) while the ring buffers (650) and the hash table (30) are located on a server (502). In this case it is not favorable to the redirection table to contain any such information which will help unauthorized decryption of physical data volume blocks. In the example, this goal has been achieved in such a way that the digest (1322) saved to the redirection table is encrypted by the server.

Figure 14:
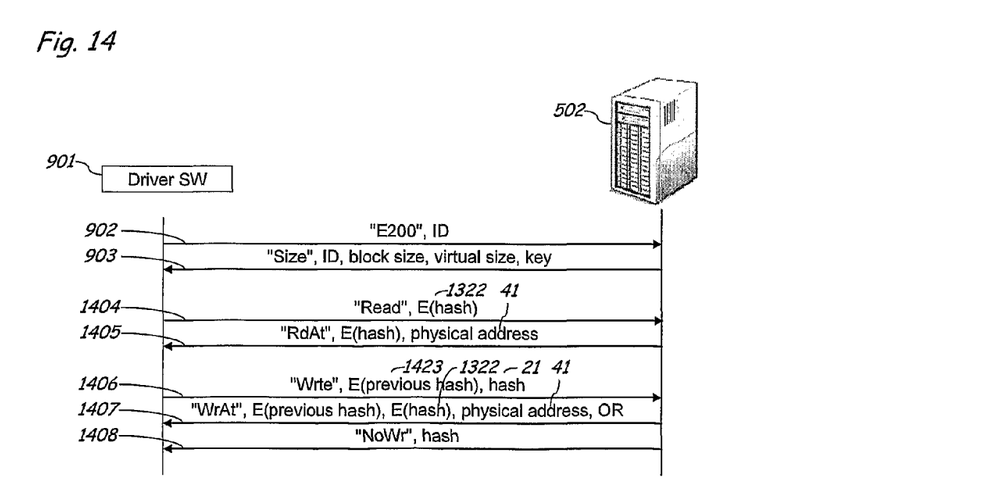
FIG. 14 shows exemplary call diagrams between the driver software and server according to embodiment mentioned above.

This leads to an exemplary change to the communication between the server (502) and driver software (901) according to FIG. 14: driver software calculates the digest from the data content and transmits it in a write request (1406) to the server. Along with the write request is transmitted also the encrypted digest (1423) residing in the record indicated by the logical block number of the hash table, which digest may be needed on the server to release the physical data storage (40) block number. In the read request (1404), the driver software transmits the encrypted digest (1322) read from the redirection table (20) and receives a physical block number (41) as a response (1405). In practice, the server encrypts the digests sent to the driver software and decrypts encrypted digests sent by the driver software before their use as explained previously in an embodiment of the invention.

Similarly, as in the previously described embodiment of the invention, in the example of FIG. 14, the responses of the read and write operations (1405 and 1407) contain an encrypted digest. If the driver software (901) waits for responses to more than one request, they can be used to identify which response belongs to which request. A person skilled in the art may easily carry out other ways to associate requests and responses.

Figure 15:
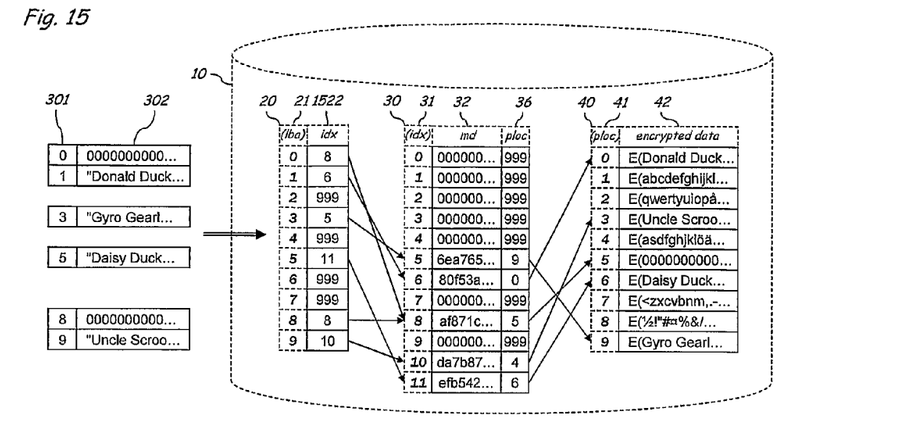
FIGS. 15 and 16 show the details of the arrangements in according to an embodiment of the invention, in which the hash table index is placed to the redirection table

Let's use FIG. 15 to examine an embodiment of the invention, in which the hash table is addressed from the redirection table (20) with the index and not with the digest: When storing a block to the logical volume (10), a record is searched from the hash table (30) according to a previously described embodiment of the invention. Unlike as described previously, instead of saving the digest (322) to the redirection table (20), a direct pointer (1522) to that record of the hash table, which includes the pointer to that physical data storage (40) record, where the content of the data block (302) is stored, preferably in encrypted form, is saved to the redirection table (20).

When reading from the logical volume (10) of the embodiment in FIG. 15, a direct pointer (1522) to the record (31) of the hash table is read from the record pointed by the logical block number (301) of the redirection table, from which record of the hash table the block number of the physical data storage (40) is in turn read, to which block number the content of the data block is saved.

Figure 16:
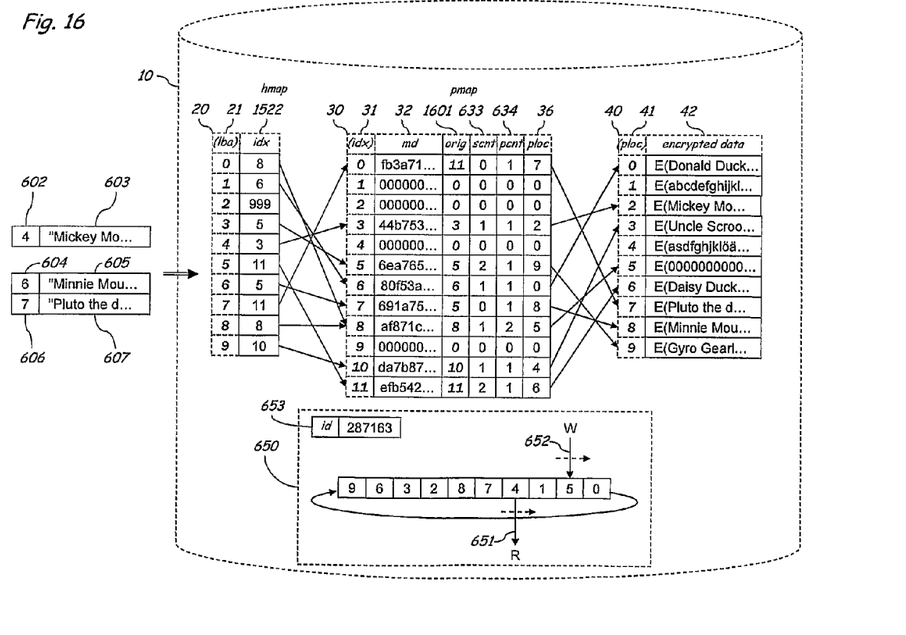

Let's keep on examining the same embodiment and the example of FIG. 16. FIG. 16 corresponds to FIG. 6, only the embodiment is different. When reading data from the logical data volume (10), a direct pointer (1522) to the hash table is used in the redirection table. As in the exemplary of FIG. 6 was previously described, data may be released from the hash table and often also from the records of the physical data storage (40) during write.

It is advantageous for the release, if the redirection table (20) or hash table (30) has the information about the record of the hash table, to which the digest was originally pointing. To the hash table of the example of FIG. 16 a field (1601) has been added concerning the original record.

Referencing to the earlier pseudocodes, the find_by_hash( ) of the embodiment in FIG. 16 might be similar to the following:

```
s = slot(h);              // start record
c = pmap[s].scnt;         // search counter
i = s;                    // index
while (c > 0) {
    if (h == pmap[i].md)
        return i;
        // same record?
    if (pmap[i].orig == s)      // changed
        c--;                    //decrement search counter
    if (++i >= pmapsiz)         // continue from the
                                // beginning
        i = 0;
}
return NOT_FOUND
```

Further, when writing the data block (603) into a logical block number i (602), a physical block number (41) is searched to it for example using the following kind of pseudocode:

```
h = hash(block);              // calculate digest
if (hmap[i] != NOT_USED) {
    if (h == hmap[i])         // same content again?
        return;               // do not need to save
    j = find_by_hash(hmap[i]);
    // release the hash table element?
    if (--pmap[j].pcnt == 0) {
        pmap[slot(hmap[j])].scnt--;
        rngq[rqend++] = pmap[j].ploc;
        if (rqend >= n)       // continue from
                              // the beginning?
            rqend = 0;
    }
}
// Set new redirection table element
hmap[i] = h;
// handle the hash table
j = find_by_hash(h);
if (j != NOT_FOUND) {         // is the same content
                              // stored?
    pmap[j].pcnt++;           // The number of
                              // references to the
                              // record
    return;                   // do not need to save
}
```

```
s = slot(h);                  // start record
pmap[s].scnt++;               // is a new record
k = s;
while (pmap[k].pcnt > 0) {    // search for free
    if (++k >= pmapsiz)
        k = 0;                // continue the search from
                              // the beginning
}
pmap[k].md = h;               // book the digest
pmap[k].orig = j;             // original record
    pmap[k].pcnt = 1;         // The number of references
                              // is 1 in the beginning
    pmap[k].ploc = rngq[rqtop++];   // find the physical
                                    // volume block
    if (rqtop >= n)           // ring buffer read pointer
        rqtop = 0,            // start from the beginning
```

Figure 17:
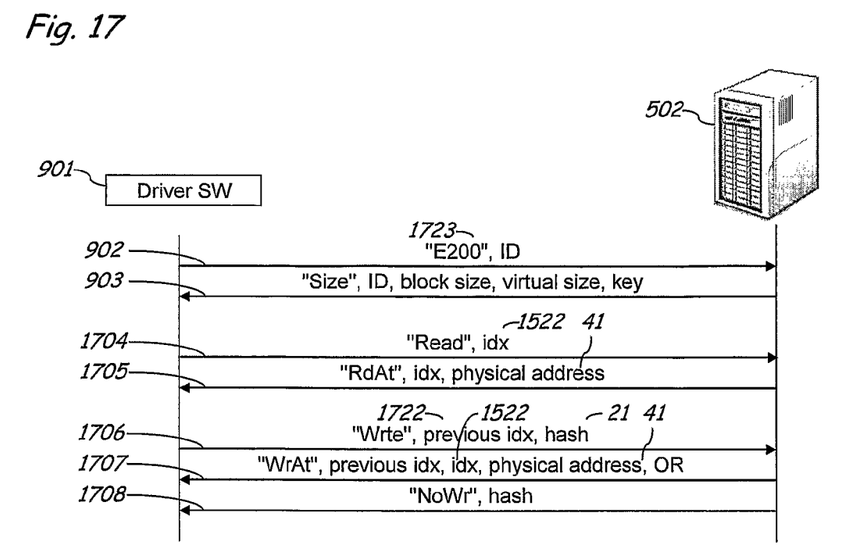
FIG. 17 shows exemplary call diagrams between the driver software and server according to an embodiment mentioned above.

Finally, when reading the logical block the physical block number is obtained as follows.

return pmap[hmap[i]].ploc;

Let's look further at the same embodiment and the exemplary change to the traffic between server (502) and driver software (901) shown in FIG. 17: software driver calculates the digest from the data block content and transmits it in the write request (1706) to the server. Along with the write request a current pointer to the hash table (1722), the pointer residing in the record indicated by the logical block number, is transmitted. It is beneficial to use this data on the server to release old blocks. In the read request (1704) the driver software transmits the direct indication (1522) to the hash table, which indication has been read from the redirection table (20), and receives as a response (1705) a physical block number (41). The following pseudocode illustrates releasing of a block:

```
i = hmap [d];            // d = block to be released
// Reduce the number of references
pmap[pmap[i].orig].scnt--;
// release the hash table element?
if (--pmap[i].pcnt == 0) {
    rngq[rqend++] = pmap[i].ploc;
    if (rqend >= n)
        rqend = 0;
}
```

Similarly, as in the previously described embodiments of the invention, in the example of drawing 17, responses of read and write operations (1705 and 1707) contain an encrypted digest. If the driver software (901) waits responses for more than one request, with their help it is possible to identify, which response belongs to which request. A person skilled in the art can easily implement also other ways to associate requests and responses.

In an embodiment of the invention the physical data storage (40) is composed of a memory device, in which the block number (41) is converted into an internal logical block number of the physical data storage. Such a data volume could be for example a network drive or even another logical data volume according to the invention.

It is easy to create different variations from the invention, especially the hash table (30) and the information about which physical data storage (40) blocks are free, can be implemented a number of ways known in the art. Similarly, the redirection table (20), hash table (30) and physical data storage (40) can be easily located on different computers. About the driver software implementation only one example for Windows was presented. In case of the other operating systems like Linux, the approach is not just rather different, but also obvious to a person skilled in the art of driver software.

The invention claimed is:

1. A method for writing data comprising data blocks numbered with corresponding logical block numbers, from a computer to a memory device arrangement, utilizing a first and a second memory devices, in which a memory of the first memory device is divided into blocks numbered with physical block numbers, the method comprising the block-wise steps of
calculating a digest utilizing at least part of a data block content;
recording the digest and the logical block number in a record of a redirection table using the logical block number as an index of the record,
obtaining from the second memory device a physical block number of a block in the first memory device, into which the data block content is to be stored, the physical block number being selected from a list of the free physical blocks in the first memory device,
encrypting the data block content,
storing the data block content into the memory of the first memory device in the position pointed by the physical block number, and
associating the physical block number with the digest, and storing the physical block number and the digest into the second memory device.

2. The method according to claim 1, wherein the first memory device is a removable storage and the second memory device is connected to an external server.

3. The method according to claim 1, wherein the redirection table is stored into the second memory device.

4. The method according to claim 1, wherein
the physical block number and digest associated with it are stored in a record of Hash table,
calculating, based on the digest, an index of the record, wherein the redirection table and the as table interlink the logical block number, the physical block number, and the digest.

5. The method according to claim 2, further comprising the steps of
connecting the external server to the computer through a network, and
authorizing the connection based on the computer, a user, or the first memory device.

6. The method according to claim 1, wherein the data block content is encrypted and wherein the encryption utilizes an encryption key, the key being at least one of the following: a separate key, the digest and the physical block number.

7. The method according to claim 1, wherein when the data block has been written into the first memory device earlier, the data block is written to a location pointed by a new physical block number.

8. A system for writing data to a memory device arrangement comprising:
a first and a second memory devices, wherein the first memory device comprises data blocks numbered with physical block numbers the system comprises means for:
a. calculating a digest from at least part of a data block content,
b. recording the digest and the logical block number in a record of a redirection table using the logical block number as index of the record,
c. selecting a physical block number, into which the data block content in the first memory device is to be stored, from a list of the free physical blocks in the first memory device,
d. encrypting the data block content,
e. storing the data block content into the first memory device in the position pointed by the physical block number, and
f. storing the digest or a number derived from it and the physical block number into the second memory device.

9. A computer program stored in a non-transitory computer-readable medium, for writing data to a memory device arrangement comprising a first and a second memory device in which the first memory device comprises a plurality of data blocks numbered with physical block numbers and the second memory device comprises references calculated from the data block digests and the physical block numbers, the computer program comprising computer executable instructions for performing the following functions:
a. calculating a digest from a data block content,
b. recording the digest and the logical block number in a record of a redirection table using the logical block number as an index of the record,
c. receiving a physical number of the block, into which data block content is to be stored in the first memory device, the physical block number being selected from a list of the free physical blocks in the first memory device,
d. encrypting the data block content,
e. storing the data block content to the first memory device to the position pointed by the physical block number,
f. storing the digest, or a number derived from it, and the physical block number to the second memory device.

* * * * *